3,324,087
CHEMICALLY CROSSLINKED POLYPHENYLENE SULFIDES

Harry A. Smith and Carl E. Handlovits, Midland, Mich., assignors to The Dow Chemical Company, Midland, Mich., a corporation of Delaware
No Drawing. Filed Mar. 27, 1963, Ser. No. 268,471
12 Claims. (Cl. 260—79.3)

The present invention relates to a novel polymeric material having high-temperature stability and excellent adhesive properties. More particularly the present invention concerns sulfur crosslinked polyphenylene sulfide and polyphenylene sulfoxide polymers, and to molding resins, laminates, and films producible therefrom.

Linear polyphenylene sulfides $(C_6H_4S)_x$, have been prepared by Macallum in U.S. Patent Nos. 2,513,188 and 2,538,941, and in commercially available quantities by the technique of copending application Ser. No. 85,209, entitled, "Method for Preparing Linear Polyarylene Sulfides," by Lenz et al., filed Jan. 21, 1961. Linear sulfoxide polymers are produced in accordance with copending application Ser. No. 268,444, filed even date herewith, entitled, "Sulfoxide Resins." These linear materials have many uses as thermoplastic polymers; however, they degrade at moderate temperatures (ca. 350°–450° C.). Therefore, it would be advantageous to have polymers of like chemical make-up with at least the equivalent chemical properties of the linear polymers, but which have greater stability to heat, e.g., stable above 600° C., and less soluble in solvents than the linear materials.

It has now been found that if the linear polymers are halogenated with a middle halogen, i.e., bromine, iodine or chlorine, and the resulting halogenated linear polymer reacted with a sulfur-yielding material there is obtained a crosslinked polymer which is in many respects like, but has improved chemical and physical properties over, the linear polymer. The degree of crosslinking is controlled principally by the halogen content of the linear polymer since the sulfur compound is generally and preferably employed in equivalent amounts. The halogen attaches to the aromatic nucleus replacing a hydrogen and while it is preferable to provide sufficient halogen to supply 1 halogen atom for each 10 to 20 phenylene moieties it is to be understood that more or less halogen can be employed with eventual resultant higher or lower degree of crosslinking. Further, the preferred amount of sulfur yielding material employed is that which will react with all of the halogen. Although preferred, it is likewise to be understood that less sulfur yielding material can be employed with a resultant remainder of some halogen in the polymer. Wherein halogen remains it is beneficial as a fire retardant. However, the present crosslinked materials are stable to relatively high temperatures and generally do not require the "fire-proofing" of the halogens, and particularly halogen is not desirable where it will react with metals at high temperatures to corrode the metals through metallic halide formation, or the like.

The new crosslinked polymers are useful as high-temperature adhesive and thus can be used as the bonding material for laminates and while infusible do soften sufficiently to be useful as molding compositions, and for forming films.

The halogenation of the linear sulfides or sulfoxide is conveniently accomplished by contacting bromine, iodine or chlorine with the linear polymer for from about 4 to 40 or more hours at from −40° to 200° C. The reaction may be carried out in the presence of an inert solvent such as the halogenated hydrocarbon solvents, e.g. carbon tetrachloride.

The halogen is employed in an amount to react from one equivalent of halogen per 100 equivalents of phenylene sulfide or phenylene sulfoxides (mer. weights) to 2 equivalents of halogen per equivalent of phenylene sulfide or phenylene sulfoxide (mer. weights). Preferably, however, it has been found advantageous to provide halogen in an amount of one equivalent of halogen per 10–20 mer. weights. In the latter instance the reaction conditions found to be most favorable so far are contacting the halogen with the linear polymer for about 24 hours at about 25° C.

The actual crosslinking is accomplished by heating the halogenated linear polymer with a divalent sulfur yielding material, such as sodium sulfide, or other alkali, alkaline earth or transition metal sulfide, at from about 150° C. to about 350° C. for from 1 to 120 hours. The ratio of sulfur to halogen is preferably such that all of the halogen is reacted. However, as before stated, less than an equivalent amount of sulfur will result in residual halogen which can be beneficial either as flame-proofing agent or as a reactive site for further chemical reaction to further modify the physical and chemical properties of the polymer. The preferred conditions for crosslinking are contacting the halogenated linear polymer with a sulfur yielding material, e.g., $Na_2S$, for about 24 hours at 300° C. employing an equivalent amount of sulfur based on the halogen content.

While substantially any sulfur yielding material could be employed which on reaction with the halogen will release the sulfur in its divalent form, the preferred sulfur compounds are the alkali metal sulfides, the transition metal sulfides, and the alkaline earth metal sulfides. Exemplary of the sulfur yielding, materials other than $Na_2S$ are, for example, sulfur+$Na_2CO_3$ to form $Na_2S$ in situ, $K_2S$, CaS, and the like.

The new resinous materials are a useful adhesive, achieving a tacky state when brought to the softening point. Thus, one can prepare laminates or joints consisting of two or more strata of a laminating material and intermediate between each strata a bonding material comprising the resins of the present invention. The resins of the present invention are sufficiently strong bonding agents for glass (fiber or sheet) metals and wood. The laminates comprising the adhesive and the strata are molded under pressures from 50 to 10,000 p.s.i. or more and temperatures from the softening point to about 400° C.

Films can be produced by pressure molding a layer of the resin on surfaces having mold release agent coatings, it being obvious that if a protective coating is desirable on a surface only the pressure exerting platen need be coated, the adhesive character of the resin at its softening point adhering the film to the surface.

The resin can also be molded into substantially any shape by merely heating the resin and applying pressure to deform the resin into the intricacies of the mold pattern. Like the films, a mold release agent is necessary to prevent the resin from adhering to the mold because of its adhesive characteristics.

It is also to be understood that in preparing any of the above enumerated items, films, moldings, or laminates, the linear polyphenylene sulfide containing nuclear halogen can be mixed with the alkali sulfide then employed to form the film or molding or bonding adhesive, the heat and pressure employed to form or spread the resin being sufficient to effect the cross-linking as hereinbefore taught.

The following examples illustrate the present invention but are not to be construed as limiting.

*Example 1.—Bromination of linear phenylene sulfide polymer*

To 2.009 grams (0.016 mer. weights) of linear phenylene sulfide polymer (melting point 265–270° C.) was added 10 ml. (0.196 mole) of bromine. The reagents were allowed to stand overnight. The excess bromine was evaporated off to obtain a yield of 4.99 grams (melting point 300–310° C.), a weight increase indicating the addition of about two bromine atoms per repeating unit. Elemental analysis showed it to be actually 1.67 bromine atoms per repeating unit.

*Example 2*

The above process was repeated using 1.57 grams (0.0146 mer. weights) of polymer and 0.075 ml. (0.00146 mole) of bromine. This resulted in the introduction of 0.096 bromine atoms per repeating unit or one in ten repeating units as shown by the weight gain and elemental analysis. Yield was 1.69 grams (melting point 267–276° C.).

*Exemple 3.—Crosslinking of brominated polymer with sodium sulfide*

A mixture was prepared employing one of the brominated polymers above and sodium sulfide in pyridine such that there was one mole of sodium sulfide for every two bromine atoms in the polymers. The mixture was heated for 48 hours at 250° C. in glass ampoules. Conversion was 96% for the polymer prepared from Example 1 and 100% for the polymer prepared from Example 2. The yields were 95 and 100%, respectively. Both polymers were insoluble in diphenyl oxide and had decompositions above 600° C. However, the polymer prepared from the halogenated linear sulfide of Example 1 was more brittle than that prepared from the linear sulfide of Example 2.

*Example 4*

A mixture of 0.7270 gram (0.00643 mer. weights) of brominated phenylene sulfide polymer (1 bromine/15 repeating units) and 0.0504 gram (0.0002075 mole) of $Na_2S \cdot 5H_2O$ was made up and placed between aluminum molding plates. The mixture was then subjected to 20,000 lbs. pressure in a press for 24 hours at 300° C. The result was an infusible, insoluble material that would not allow the molding plates to be separated.

*Example 5*

To illustrate the adhesive strength of the resins of the present invention, two metal strips 1″ x 4″ x 0.062″ were cleaned by degreasing in methyl ethyl ketone, rinsed with distilled water, scrubbed with scouring powder, rinsed again, etched with aqua regia (1 part $HNO_3$, 3 parts HCl) rinsed and dried under vacuum at 115°–150° C. The strips were used immediately upon being taken from the oven. A lap joint was prepared with a mixture of the brominated resin and the crosslinking agent between the strips (unless otherwise specified) and the lap joint molded under pressure of 2000 lbs. ram pressure at 300° C. for 15 hours. The area of overlap being ½″ x 1″. The bond strengths were tested on an Instron test machine employing ASTM test No. 1002 SST. The results of this test for several resins prepared in accordance with the present invention are recorded below.

| Average Length of Linear Polymer * (mers.) | Density of Crosslink (mers./link) | Crosslinking Agent | Bond Strength, p.s.i. |
|---|---|---|---|
| 52 | | | 208 |
| 16 | 9.5 | $Na_2S \cdot H_2O$ | 620 |
| 48 | 15.5 | $Na_2S \cdot H_2O$ | 605 |
| 48 | 15.5 | $K_2S$ | 780 |
| 105 | 27 | $K_2S$ | 2,260 |
| 93 | 15 | $K_2S$ | 3,020 |
| 93 | 27 | $K_2S$ | 1,916 |
| 93 | 27 | $K_2S$ | 3,330 |
| 93 | 48 | $K_2S$ | 1,905 |

* Linear polyphenylene sulfide.

*Example 6*

In a like manner to Example 1 a linear sulfoxide prepared in accordance with Example 1 of copending application Ser. No. 268,444, filed even date herewith, entitled "Sulfoxide Resins," having a molecular weight of 8000 and a melting point of 280°–290° C. and a melt viscosity of about 2400 poises at 303° C. is halogenated with sufficient bromine to react with about every 15th aromatic repeating group, then reacted with sodium sulfide in an amount sufficient to react with all of the bromine. There is obtained as a result of these operations a substantially infusible phenylene sulfoxide polymer crosslinked about every 15th phenylene moiety with sulfur which exhibits the improved thermal stability of the sulfide crosslinked polymers of Examples 3 and 4 and is substantially insoluble in diphenyl oxide.

Laminates prepared from crosslinked sulfoxide by the technique of Example 5 have like improvements over the linear sulfoxide polymer as do the crosslinked sulfide polymers over the linear sulfide polymers.

We claim:

1. A method which comprises halogenating with a middle halogen having an atomic number from 17 to 53 at from about −40° to about 200° C. a polymer selected from the class consisting of linear polyphenylene sulfides and polyphenylene sulfoxides, the amount of halogen being sufficient to provide at least two halogen atoms for each chain of phenylene sulfide moieties, removing any excess halogen and contacting the halogenated polymer with an inorganic sulfide selected from the group consisting of alkali, alkaline earth metal sulfides, and transition metal sulfides, in an amount sufficient to react with a major portion of the halogen atoms, at a temperature of from about 150° to 350° C. for from about 1 to 120 hours.

2. A method as in claim 1 wherein the halogen is bromine.

3. A method as in claim 1 wherein the halogen is chlorine.

4. A laminate comprising a plurality of strata of materials selected from the group consisting of glass, metal and wood, bonded together by a resin which is the crosslinked product of a reaction between sulfide selected from the group consisting of alkali, alkaline earth metal and transition metal sulfides and a halogenated linear polyphenylene sulfide, said reaction being conducted at from about 150° to 350° C. for from 1 to 120 hours, said halogen having an atomic number from 17 to 53.

5. A laminate as set forth in claim 4 which results when the reaction between the linear halogenated polyphenylene sulfide and the alkali metal sulfide is conducted after preparation of the strata and adhesive and under a pressure of from 50 to 10,000 p.s.i.

6. A method which comprises contacting a linear halogenated polyphenylene sulfide having at least two halogen atoms for each phenylene sulfide chain with a sulfide selected from the group consisting of alkali, alkaline earth metal and transition metal sulfides in an amount sufficient to react with a major portion of the halogen atoms at a time and at a temperature sufficient to accomplish completion of the reaction.

7. A resin consisting of polyphenylene sulfoxide linear chains crosslinked at least twice between every phenylene sulfide chain by sulfur.

8. A laminate comprising a plurality of strata of materials selected from the group consisting of glass, metal and wood, bonded together by a resin which is the crosslinked product of a reaction between sulfide selected from the group consisting of alkali, alkaline earth metal, and transition metal sulfides and a halogenated linear polyphenylene sulfoxide, said reaction being conducted at from about 150° to 350° C. for from 1 to 120 hours, said halogen having an atomic number from 17 to 53.

9. A laminate as set forth in claim 8 which results when the reaction between the linear halogenated polyphenylene sulfoxide and the alkali metal sulfide is conducted after preparation of the strata and adhesive and under a pressure of from 50 to 10,000 p.s.i.

10. A method which comprises contacting a linear halogenated polyphenylene sulfoxide having at least two halogen atoms for each phenylene chain with a sulfide selected from the group consisting of alkali, alkaline earth metal and transition metal sulfides in an amount sufficient to react with a major portion of the halogen atoms at a time and at a temperature sufficient to accomplish completion of the reaction.

11. A method which comprises halogenating with a middle halogen having an atomic number from 17 to 53 at from −40° to about 200° C. a linear polyphenylene sulfoxide, the amount of halogen being sufficient to provide at least two halogen atoms for each chain of phenylene moieties, removing any excess halogen and contacting the halogenated polymer with an inorganic sulfide selected from the group consisting of alkali, alkaline earth metal sulfides, and transition metal sulfides, in an amount sufficient to react with a major portion of the halogen atoms, at a temperature of from about 150° to 350° C. for from about 1 to 120 hours.

12. A method which comprises halogenating with a middle halogen having an atomic number from 17 to 53 at from −40° to about 200° C. a linear polyphenylene sulfoxide, the amount of halogen being sufficient to provide at least two halogen atoms for each chain of phenylene moieties, removing any excess halogen and contacting the halogenated polymer with an inorganic sulfide selected from the group consisting of alkali, alkaline earth metal sulfides, and transition metal sulfides, in an amount sufficient to react with a major portion of the halogen atoms, at a temperature of from about 150° to 350° C. for from about 1 to 120 hours.

References Cited

UNITED STATES PATENTS

| | | | |
|---|---|---|---|
| 2,538,941 | 1/1951 | Macallum | 260—79.1 X |
| 2,893,906 | 7/1959 | Taylor | 161—187 X |
| 3,044,961 | 7/1962 | Morway et al. | 260—609 X |

JOSEPH L. SCHOFER, *Primary Examiner.*

D. K. DENENBERG, *Assistant Examiner.*